United States Patent

[11] 3,566,975

[72] Inventors Arthur Clifford Howard;
　　　　　　　John Arthur Howard, West Horndon, England
[21] Appl. No. 805,975
[22] Filed Feb. 24, 1969
[45] Patented Mar. 2, 1971
[73] Assignee Rotary Hoes Limited
　　　　　　　West Horndon, Essex, England

[54] MOUNTING EARTH-WORKING TOOLS ON THE ROTOR OF A CULTIVATING MACHINE
7 Claims, 6 Drawing Figs.

[52] U.S. Cl. ................................................. 172/540,
　　　　　　　172/123, 172/753, 287/114
[51] Int. Cl. ................................................. A01b 21/04
[50] Field of Search ....................................... 172/556,
　　　540, 753, 123; 37/142, 142 (R); 287/114, 126

[56] References Cited
UNITED STATES PATENTS 1,168,469　1/1916　Benson ........................ (37/142UX)
2,222,071　11/1940　Gustafson ..................... 37/142X
2,708,866　5/1955　Shonts ......................... 172/540
2,802,408　8/1957　Seaman ........................ 172/556X

FOREIGN PATENTS 797,094　6/1958　Great Britain ................ 287/115

Primary Examiner—Robert E. Bagwill
Assistant Examiner—Alan E. Kopecki
Attorney—Mawhinney & Mawhinney ABSTRACT: An earthworking tool and tool holder and a combination thereof are for use with a rotor of a cultivating machine, and the tool and tool holder are provided with a quick release securing mechanism including a root element on the tool or the tool holder which engages between corresponding wedging surfaces on the tool holder or tool respectively. The mechanism is such that during operation movement of the tool in its working direction tends to increase the wedging engagement between the tool and holder.

INVENTORS
ARTHUR CLIFFORD HOWARD
JOHN ARTHUR HOWARD

PATENTED MAR 2 1971

INVENTORS
ARTHUR CLIFFORD HOWARD,
JOHN ARTHUR HOWARD.

3,566,975

MOUNTING EARTH-WORKING TOOLS ON THE ROTOR OF A CULTIVATING MACHINE

This invention relates to an earthworking tool and a toolholder and to combinations thereof for the rotor of a cultivating machine. In particular, but not exclusively, the invention relates to tools and toolholders used with a cultivating machine rotor which has outwardly directed earthworking tools and the rotor is adapted to be supported with its axis transverse to the direction of travel from a cultivating machine. The tools of such a rotor have flat shank portions by which the tools are mounted on radially extending flanges of the rotor, the plane of the shanks being aligned with the direction of travel of the machine.

Hitherto the holders for such tools have been constituted by the rotor flanges, and bolts and coacting nuts have secured the tools to the holders. When the tools have to be replaced due, for example, to becoming worn or to equip the rotor with tools of a different type, the nuts and bolts are difficult to remove and the replacement becomes a time-consuming operation, particularly when a large number of tools are provided on the rotor.

Accordingly an object of the invention is to provide a tool and toolholder combination in which the tools are readily detached from and attached to the holder and which firmly secures the tool in the holder.

According to one aspect, the invention provides an earthworking tool and toolholder combination, for the rotor of a cultivating machine, comprising a wedging mechanism for releasably securing the tool to the holder, the mechanism including a root portion on either the tool or the holder adapted to engage between wedging surfaces on the associated holder or tool respectively, the wedging surface being directed and arranged such that during movement of the tool and holder in the operative direction of the tool the wedging engagement between the tool and the holder tends to increase.

Preferably the root portion is formed on the tool shank.

Preferably also the wedging surfaces of the mechanism are in the form of a dovetail connection so that the tool cannot be disengaged from the holder in the sideways direction.

The wedging surfaces may be formed as the sides of a channel and the root portion may be formed as a flat loop. The bight of the flat loop may form a cavity and be of greater thickness than the remainder of the loop.

According to a second aspect the invention provides an earthworking tool adapted to be releasably secured by a wedging action to a toolholder to form the said tool and toolholder combination.

According to a third aspect the invention provides a toolholder adapted to releasably secure an earthworking tool by a wedging action to form the said tool and toolholder combination.

According to a fourth aspect the invention provides a cultivating machine rotor including the said toolholder.

According to a fifth aspect the invention provides an earthworking tool comprising a root portion formed on the tool shank and defining surfaces adapted for wedging engagement with corresponding wedging surfaces on a toolholder to thereby releasably secure the tool to the holder.

Further features of the invention appear from the following description of embodiments of the invention given by way of example and with reference to the accompanying drawings, in which.

Figure 1:
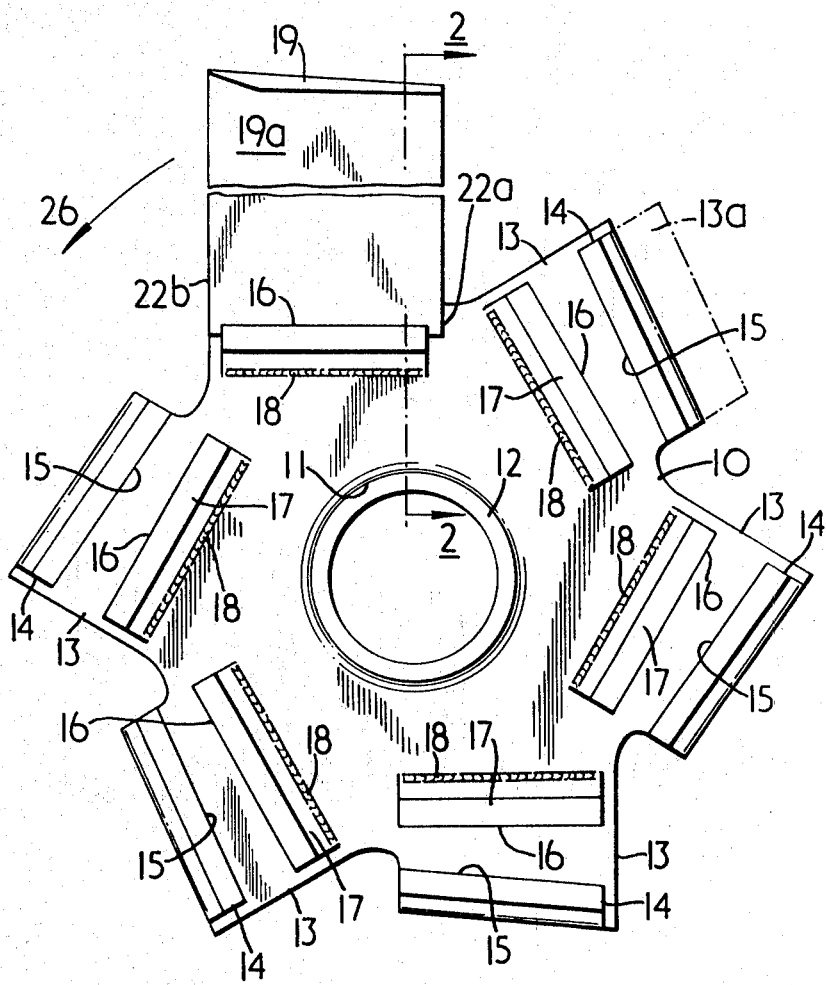
FIG. 1 is an end elevation of one embodiment of a cultivating machine rotor fitted with toolholders and a tool.
Figure 2:
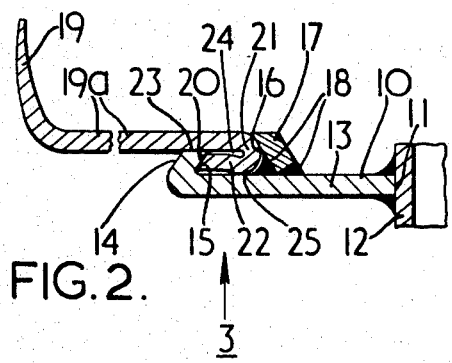
FIG. 2 is a section on the line 2-2 in FIG. 1.
Figure 3:
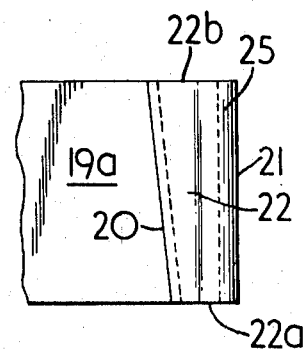
FIG. 3 is a view in the direction of arrow 3 in FIG. 2 of the end portion of a tool shank.

Referring to FIGS. 1—3 of the drawings, a rotor disc 10 has a central hole 11 by which the disc is coaxially secured to a driven rotor shaft 12 by welding as shown, or by any other convenient means.

In positions 60° apart, the rotor disc 10 is provided with parallel-sided extensions 13 which have their radially outer ends cut obliquely (as indicated in chain lines 13a in FIG. 1) and then turned over, parallel to the oblique cut, to form an in-turned lip 14. The radially inner surface 15 of each lip is inclined at an acute included angle with the adjacent surface of the rotor disc 10, and provides one of the sidewalls of a dovetail channel. The other wall of each dovetail channel is provided by the radially outer surface 16 of a respective straight bar 17 which is rigidly secured by welds 18 to the rotor disc 10 so as to incline towards the corresponding in-turned lip 14. The radially outer surfaces 16 of the bars 17, and the corresponding radially inner surfaces 15 of the in-turned lips 14 are set at such equal angles in the plane of the rotor disc 10 that the dovetail channels 15, 16 they define converge in the clockwise sense. The extension 13, the lip 14 and the bar 17 together define a toolholder for a tool 19.

With reference to FIG. 2, the tool 19 has a shank 19a which has its radially inner transverse edge 20 cut at the same oblique angle as the in-turned lip 14, and the adjacent shank portion is bent transversely to form a generally flat loop constituting a root portion of the tool of which the bight is shown at 21 and the turned-over portion at 22. The edge 20 is chamfered so that it will make flat contact with the radially inner surface 15 of the in-turned lip 14, whilst the outer curved surface of the bight 21 makes contact with the radially outer surface 16 of the bar 17 throughout its length.

The surface 23 of the in-turned lip 14 is rough machined or shorn so as to have flat roughened contact with the adjacent side of the tool shank 19a. The bight 21 can include a cavity as indicated at 24.

It will be seen from FIG. 3 that the turned-over portion 22 of each tool shank 19a constitutes a wedge of the same included angle as the dovetail channels 15, 16. To assemble each tool 19 to the rotor disc 10, the thin end 22a of its turned-over portion 22 is offered up to the wide end of the corresponding dovetail channel 15, 16 and is urged inwardly into wedging engagement with the dovetail channel, for instance, by means of a series of hammer blows applied to its thick end 22b. In this condition of wedging engagement, the interaction of the dovetail surface 15 with the edge 20 and the interaction of the external surface of the bight 21 with the dovetail surface 16 together with the relative wedge angle, urges the external surface 25 of the bight into firm engagement with the portion of the extension 13 forming the bottom of the dovetail channel 15, 16, and also urges the shank 19a into firm engagement with the surface 23 of the in-turned lip 14 so as to hold the tool 19 tightly in position. It should be noted that the cavity 24 makes the bight 21 resiliently compressible to a small extent so as to enhance the firm engagement of the external surface 25 with the bottom of the dovetail channel; also that, as the edge 20 is at the extremity of the resilient cantilever constituted by turned-over portion 22, the shank 19a will be pulled resiliently on to edge 23 by the resilient deflection of the cantilever portion 22 towards the bottom of the dovetail channel by the dovetail surface 15 due to the wedging action.

It will be understood that the greater the width of the dovetail channels 15, 16 and the associated wedges 20, 21, 22, the greater will be the restraining moment acting on the shanks 19a to prevent them from being tipped out of their planes due to the working loads imposed on them during use.

The direction of the dovetail channels 15, 16 is chosen so that, during the anticlockwise operation of the rotor disc 10 indicated by arrow 26 in FIG. 1, the resistance to ground penetration of the tools 19 tends to urge the turned-over wedge portions 22 further into their dovetail channels 15, 16 thereby enhancing the wedging action.

When it is desired to remove the tools 19, the rotor disc 10 is brought to rest, and each tool 19 is in turn urged outwardly out of wedging engagement with its corresponding dovetail channel 15, 16 for instance, by means of a series of hammer blows delivered to the thin end 22a of its turned-over portion 22. In this manner each tool 19 is driven out of wedging engagement with its dovetail channels 15, 16, and is then withdrawn out of the wide end thereof. Conveniently, as illustrated in FIG. 1, the thin ends 22a of the turned-over wedge portions 22 when fully driven home extend out of the narrow ends of their dovetail channels 15, 16 for facilitating the delivery of the hammer blows or other disengagement force.

Figure 4:
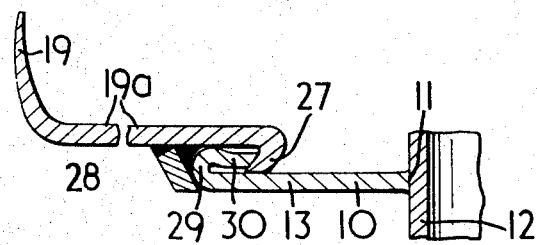
FIG. 4 is an alternative form of tool and toolholder for use in a rotor of the kind shown in FIG. 1.

As an alternative to the tool-holding arrangement as described with reference to FIGS. 1—3 the arrangement shown in FIG. 4 may be employed. In this arrangement the channel constituting the toolholder is formed on the tool 19 by providing an in-turned lip 27 on the inner end of the shank 19a and a bar 28 is welded to the shank 19a to provide the other wall of the channel in a similar manner to the channel in the previously described arrangement. The extension 13 is formed with a flat loop, constituting a root portion of the wedging mechanism and at the same time the toolholder. The flat loop has a bight 29 and a turned-over portion 30, and the root portion engages in the channel in a similar dovetail wedging arrangement as previously described.

Figure 5:
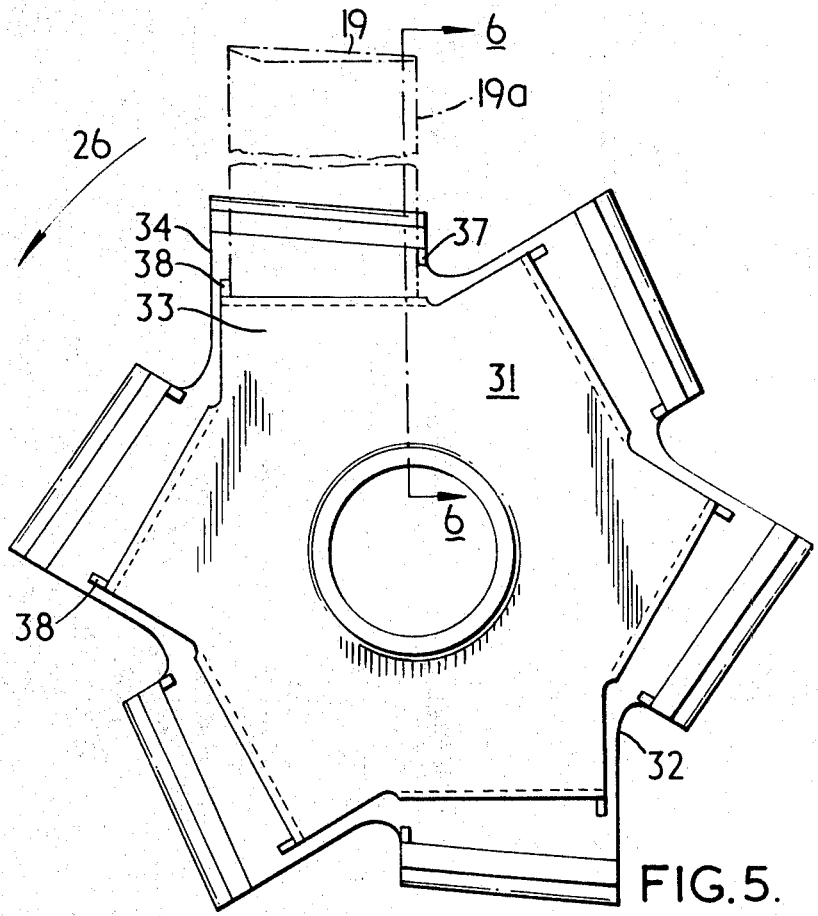
FIG. 5 is an end elevation of a second embodiment of cultivating machine rotor fitted with toolholders and a tool.
Figure 6:
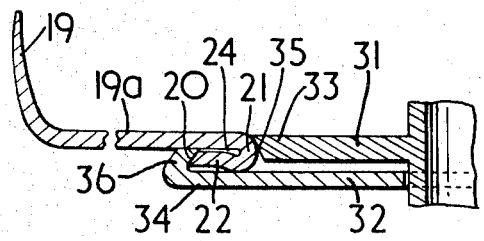
FIG. 6 is a section on the line 6-6 in FIG. 5.

Referring now to FIGS. 5 and 6 an alternative form of cultivating machine rotor is shown. In this embodiment the rotor is formed of two coaxial discs 31 and 32 the discs each having extensions 33 and 34 respectively, the extensions 33 of the disc 31 coacting with the extensions 34 of the disc 32 to form toolholders for tools 19 (only one of which is shown). The tool 19 is of a similar form to the tool described with respect to FIGS. 1—3 and the same reference numerals are used in the present embodiment as in FIGS. 1—3 for similar portions of the tool.

The disc 31 is located with its periphery radially inwardly of the periphery the disc 32 and the disc 31 is secured rigidly to a shaft 12. The disc 32 is free for limited relative rotation with respect to the disc 31.

The inner disc 31 is formed with a chamfered edge 35 on each of the extensions 33 and the extensions 34 of the outer disc 32 are formed with an in-turned lip 36 on each extension 34, the edge 35 and the lip 36 and the extension 34 together defining a channel with inwardly inclined sides for receiving the root portion of the tool shank 19a. The rotor is adapted for rotation in the direction of the arrow 26 and on the trailing end of the lip 36 is formed a tongue 37 for restricting rearward movement of the root in the channel. At the leading end of the edge 35 is a tongue 38 for restricting movement of the root in the forward direction. The root of the tool 19 is located in and removable from the channel by causing limited relative rotation of the two discs 31 and 32 and thereby moving the lip 36 and the edge 35 away from one another. The root of the tool 19 can then be inserted between the lip 36 and the edge 35 to engage with the wedging surfaces.

The lip 36 and the edge 35 taper towards one another in the direction opposite to the direction of rotation of the rotor, and the lip 36 and the edge 35 together define wedging surfaces for the wedge-shaped root portion of the tool 19. When the disc 31 is rotated in the operative direction of the tool 19 the root portion is urged into wedging engagement by reaction of the tool and the wedging action of the tool and toolholder tends to increase.

The disc 32 is carried round with the disc 31 by the wedging engagement between the disc 31 the tool 19 and disc 32. Thus in many respects the tool and toolholder combination described with respect to FIGS. 5 and 6 operates in a similar manner to that described with reference to FIGS. 1—3 and FIG. 4.

Although the invention has been described specifically with reference to a specially constructed rotor disc, it should be appreciated that the principles disclosed can be applied readily to other forms of rotor for driving earthworking tools. In particular, a conventional earthworking rotor can be converted for using the wedge-type tools 19 disclosed, by bolting an adapter plate defining a suitable dovetail channel 15, 16 to the usual attachment holes for the conventional type of tools. In this manner, the bolts securing the adapter plates to the conventional type rotor can remain secured, and earthworking tools of the wedge-type can be fitted and removed without manipulating any of the hitherto necessary bolts.

We claim:

1. A rotary cultivator earthworking tool and toolholder combination in which the toolholder includes a flange radially directed with respect to the axis of a rotor shaft of the rotary cultivator, a portion of the toolholder defining part of a wedging mechanism having wedging surfaces which are directed transversely to an end face of the flange which face extends at a right angle to the axis of the rotor shaft, a portion of the tool defining another part of the wedging mechanism and having wedging surfaces engaging with the wedging surfaces on the toolholder, one of said portions being a root element having its wedging surfaces wedgingly engaged between the wedging surfaces on the other of said portions, the wedging surfaces on each of said portions being directed and arranged such that during movement of the combination in the operative direction of the tool the wedging engagement between the tool and toolholder tends to increase.

2. The combination as claimed in claim 1 wherein the wedging surfaces on the said portions are in the form of a dovetail connection.

3. The combination as claimed in claim 1 wherein the wedging surfaces on said other of said portions are formed as the sides of a channel.

4. The combination as claimed in claim 1 wherein the root element is formed as a flat loop having a turned-over portion in contact with the remainder of the loop.

5. The combination as claimed in claim 4 wherein a bight of the flat loop forms a cavity and the bight has a greater thickness than the remainder of the loop in the direction transversely of the loop.

6. The combination as claimed in claim 1 wherein the toolholder includes two flanges directed radially of the rotor shaft, the flanges being coaxial and closely adjacent and defining wedging surfaces between which the root element is engaged.

7. The combination as claimed in claim 1 wherein the earthworking tool has a flat shank extending in a plane parallel to the toolholder flange.